US009688830B2

(12) United States Patent
Emmrich-Smolczyk et al.

(10) Patent No.: US 9,688,830 B2
(45) Date of Patent: Jun. 27, 2017

(54) PUR FOAM WITH ENLARGED CELL STRUCTURE

(71) Applicant: EVONIK INDUSTRIES AG, Essen (DE)

(72) Inventors: Eva Emmrich-Smolczyk, Essen (DE); Harald Modro, Gladbeck (DE); Ralf Althoff, Haltern am See (DE); Rainer Ziegler, Herne (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/785,460

(22) PCT Filed: Apr. 10, 2014

(86) PCT No.: PCT/EP2014/057235
§ 371 (c)(1),
(2) Date: Oct. 19, 2015

(87) PCT Pub. No.: WO2014/170198
PCT Pub. Date: Oct. 23, 2014

(65) Prior Publication Data
US 2016/0068647 A1  Mar. 10, 2016

(30) Foreign Application Priority Data
Apr. 19, 2013  (DE) .................. 10 2013 207 117

(51) Int. Cl.
*C08J 9/12* (2006.01)
*C08G 18/48* (2006.01)
*C08G 18/63* (2006.01)
*C08G 18/76* (2006.01)
*C08G 18/16* (2006.01)
*C08G 18/18* (2006.01)
*C08G 18/24* (2006.01)
*C08G 18/40* (2006.01)
*C08J 9/00* (2006.01)
C08G 101/00 (2006.01)

(52) U.S. Cl.
CPC ............ *C08J 9/125* (2013.01); *C08G 18/165* (2013.01); *C08G 18/1808* (2013.01); *C08G 18/1825* (2013.01); *C08G 18/1833* (2013.01); *C08G 18/244* (2013.01); *C08G 18/409* (2013.01); *C08G 18/4072* (2013.01); *C08G 18/4829* (2013.01); *C08G 18/632* (2013.01); *C08G 18/7607* (2013.01); *C08G 18/7621* (2013.01); *C08J 9/0023* (2013.01); *C08G 2101/005* (2013.01); *C08G 2101/0008* (2013.01); *C08G 2101/0083* (2013.01); *C08G 2350/00* (2013.01); *C08J 2375/08* (2013.01)

(58) Field of Classification Search
CPC ...... C08J 9/125; C08J 9/0023; C08J 2375/08; C08G 18/409; C08G 18/1833; C08G 18/4829; C08G 18/244; C08G 18/7607; C08G 18/1808; C08G 18/165; C08G 18/632; C08G 18/7621; C08G 18/4072; C08G 18/1825; C08G 2101/0083; C08G 2101/0008; C08G 2101/005; C08G 2350/00
See application file for complete search history.

(56) References Cited

U.S. PATENT DOCUMENTS

| | | | |
|---|---|---|---|
| 3,201,359 A | 8/1965 | Herrick et al. | |
| 3,346,557 A | 10/1967 | Patton, Jr. | |
| 3,933,695 A | 1/1976 | Omietanski et al. | |
| 4,042,540 A | 8/1977 | Lammerting et al. | |
| 4,147,847 A | 4/1979 | Schweiger | |
| 4,588,755 A | 5/1986 | Kollmeier et al. | |
| 4,687,786 A | 8/1987 | Kollmeier et al. | |
| 4,855,379 A | 8/1989 | Budnik et al. | |
| 5,075,343 A | 12/1991 | Blount | |
| 5,306,737 A | 4/1994 | Burkhart et al. | |
| 5,321,051 A | 6/1994 | Burkhart et al. | |
| 5,633,292 A | 5/1997 | Brune et al. | |
| 6,080,800 A | 6/2000 | Frey et al. | |
| 6,271,272 B1 * | 8/2001 | Carlier .................. | C08J 9/0061 521/56 |
| 6,433,121 B1 | 8/2002 | Petrovic et al. | |
| 7,838,566 B2 | 11/2010 | Glos et al. | |
| 8,303,843 B2 | 11/2012 | Glos et al. | |
| 8,623,984 B2 | 1/2014 | Henning et al. | |
| 8,735,458 B2 | 5/2014 | Glos et al. | |
| 2002/0103091 A1 | 8/2002 | Kodali | |
| 2005/0176837 A1 | 8/2005 | Eilbracht et al. | |

(Continued)

FOREIGN PATENT DOCUMENTS

DE  2533074  3/1976
DE  3508292 C1  6/1986

(Continued)

OTHER PUBLICATIONS

Hou, C., "Microbial Oxidation of Unsaturated Fatty Acids", Advance in Applied Microbiology, 1995, vol. 41, pp. 1-23.
Petrovic, Z.S., et al., "Structure and Properties of Polyurethanes Prepared from Triglyceride Polyols by Ozonolysis", Biomacromolecules 2005, vol. 6, pp. 713-719.
International Search Report dated Jun. 17, 2014 issued in EP2014/057235.
English Abstract of EP 1777252 A1, dated Apr. 25, 2007.

*Primary Examiner* — John Cooney
(74) *Attorney, Agent, or Firm* — Philip P. McCann; Smith Moore Leatherwood LLP

(57) ABSTRACT

Described are (a) a process for production of polyurethane foam by reacting one or more polyol components with one or more isocyanate components, wherein wax having a congealing point in the range from 40° C. to 90° C. is employed as an additive, (b) a polyurethane foam obtainable by said process, (c) the use of waxes having a congealing point in the range from 40° C. to 90° C. as an additive in the manufacture of polyurethane foams to coarsen the foam structure, and also (d) a polyurethane foam production composition containing a wax having a congealing point in the range from 40° C. to 90° C.

19 Claims, No Drawings

(56) References Cited

U.S. PATENT DOCUMENTS

| | | |
|---|---|---|
| 2006/0229375 A1 | 10/2006 | Hsiao et al. |
| 2007/0072951 A1 | 3/2007 | Bender et al. |
| 2009/0088489 A1 | 4/2009 | Terheiden et al. |
| 2013/0041057 A1 | 2/2013 | Emmrich-Smolczyk et al. |
| 2013/0041058 A1 | 2/2013 | Emmrich-Smolczyk et al. |
| 2014/0221518 A1 | 8/2014 | Emmrich-Smolczyk et al. |

FOREIGN PATENT DOCUMENTS

| | | |
|---|---|---|
| DE | 4229402 A1 | 3/1994 |
| DE | 4239054 A1 | 5/1994 |
| DE | 4444898 C1 | 10/1996 |
| DE | 19629161 A1 | 1/1998 |
| DE | 102004001408 A1 | 7/2005 |
| DE | 102005050473 A1 | 4/2007 |
| DE | 102007046860 A1 | 4/2009 |
| EP | 0152878 A2 | 8/1985 |
| EP | 0380993 A2 | 8/1990 |
| EP | 0409035 A2 | 1/1991 |
| EP | 0493836 A1 | 7/1992 |
| EP | 0532939 A1 | 3/1993 |
| EP | 0533202 A1 | 3/1993 |
| EP | 0780414 A2 | 6/1997 |
| EP | 0839852 A2 | 5/1998 |
| EP | 0867464 A1 | 9/1998 |
| EP | 0867465 A1 | 9/1998 |
| EP | 1061095 A1 | 12/2000 |
| EP | 1095968 A1 | 5/2001 |
| EP | 1537159 | 6/2005 |
| EP | 1544235 A1 | 6/2005 |
| EP | 1678232 | 7/2006 |
| EP | 1683831 A1 | 7/2006 |
| GB | 1085037 A | 9/1967 |
| GB | 1106242 * | 3/1968 |
| WO | WO 2004/020497 A1 | 3/2004 |
| WO | WO 2004/096744 A2 | 11/2004 |
| WO | WO 2004/096882 A1 | 11/2004 |
| WO | WO 2005/033167 A2 | 4/2005 |
| WO | WO 2005/118668 A1 | 12/2005 |
| WO | WO 2006/094227 A2 | 9/2006 |
| WO | WO 2006/116456 A1 | 11/2006 |
| WO | WO 2009/058367 A1 | 5/2009 |

* cited by examiner

PUR FOAM WITH ENLARGED CELL STRUCTURE

The present invention resides in the field of polyurethanes and relates in particular to a process for producing polyurethane foam using an additive wax. The present invention further relates to polyurethane foam obtainable by such a process. The present invention relates to the use of the additive wax in the manufacture of polyurethane foams. The present invention also relates to a composition for producing polyurethane foam.

Polyurethanes in their various manifestations are obtainable by the polymerization of diisocyanates, for example 4,4'-methylenebis(phenyl isocyanate), MDI for short, or 2,4-tolylene diisocyanate, TDI for short, with polyether polyols or polyester polyols. Polyether polyols are obtainable, for example, by alkoxylation of polyhydroxyl-functional starters. Commonly used starters are, for example, glycols, glycerol, trimethylolpropane, pentaerythritol, sorbitol or sucrose. Of particular interest are polyurethane foams as demanded in the automotive industry or the furniture sector, for example. Blowing agents may be additionally employed in the production of polyurethane foams, examples being pentane, methylene chloride or other hydrohalocarbons, acetone or carbon dioxide. Polyurethane foam is typically stabilized using surface-active substances, in particular surfactants. A multiplicity of different types of polyurethane foam are known, for example hot-cure flexible foam, cold-cure foam, ester foam, rigid PUR foam and rigid PIR foam.

A fundamental objective in connection with the production of polyurethane foams is to influence the cellular structure of the resulting foam as it is being formed.

The problem addressed by the present invention against this background was that of providing polyurethane foams that have a coarsened cellular structure.

"Coarsened cellular structure" is to be understood as meaning in relation to the individual cells of the cell collective an increase in size for individual cells and hence, with regard to the cellular structure of the foam, a decrease in the number of cells per unit length as determined by microscopy, for example.

The problem addressed by the present invention is solved by the subject-matter of the present invention.

The present inventors found that, surprisingly, the employment of certain waxes as an additive in the production of polyurethane foams leads to a coarsening of the cellular structure of the foam, i.e. an increase in the size of individual cells and a decrease in the number of cells per unit length.

The invention provides a process for production of polyurethane foam by reacting one or more polyol components with one or more isocyanate components, wherein wax having a congealing point in the range from 40° C. to 90° C. is employed as an additive.

This process of the present invention coarsens the cellular structure of the resulting foam in the sense of increasing the size of individual cells and decreasing the number of cells per unit length versus foam obtained in a similar manner but without employing the additive wax. The number of cells per unit length is quantifiable, for example, by cutting open a foam slab and colouring the uppermost level of the cut face black, for example with a pen. Using a magnifying glass, the number of cells within a centimeter can then be counted visually. The invention delivers a further advantage in that the moisture removal ability of the foam increases, in particular as regards water vapour. This is a significant advantage as regards the so-called breathability of the material, a frequent consumer requirement. This thus further enables the production of polyurethane foams with an enhanced ability to remove heat. It is a further particular advantage of the invention that the effect of the coarsened cellular structure is observed homogenously throughout the entire foam. There is yet a further advantage associated therewith: a particularly regular distribution of density is ensured. It is further particularly advantageous that the physical properties of the foam are not adversely affected by the coarsening of the cellular structure. The present invention thus makes it possible to rely on tried and tested processes for production of polyurethane foam and to admix the wax to be employed according to the present invention to bring about coarsening of the cellular structure.

Waxes are known per se to those skilled in the art. Waxes are divided according to their origin into three classes, namely (a) natural waxes, in particular with the 3 sub-groups of (a1) plant waxes (e.g. cotton wax, carnauba wax, candelilla wax, esparto wax, guaruma wax, japan wax, cork wax, montan wax, Ouricury wax, rice germ oil wax, sugarcane wax), (a2) animal waxes (e.g. beeswax, preen gland fat, wool wax, shellac wax, spermaceti) and (a3) mineral waxes (e.g. microwaxes, ceresin, ozokerite, (b) chemically modified waxes, in particular with the sub-group of hard waxes (e.g. hydrogenated jojoba waxes, montan wax, sasol waxes) and (c) synthetic waxes, e.g. polyalkylene waxes (polyolefin waxes, polyethylene waxes, polypropylene waxes), polyethylene glycol waxes, amide waxes.

In principle, any waxes or wax mixtures having a congealing point in the range from 40° C. to 90° C. are employable for the purposes of this invention.

Congealing point refers to the temperature at which a liquid substance transitions into the solid state. A person skilled in the art knows how to determine the congealing point of waxes, it may be more particularly done in accordance with ISO 2207.

In one preferred embodiment of the invention, the wax has a congealing point in the range from 50° C. to 85° C., preferably from 55° C. to 80° C., in particular from 60° C. to 75° C. This makes for a particularly efficient way to coarsen the cellular structure.

In a further preferred embodiment of the invention, the wax to be used according to the present invention is selected from mineral waxes, synthetic waxes or mixtures thereof.

It is particularly preferable here for the wax to have a predominantly microcrystalline structure, in particular for it to be a microcrystalline wax. Predominantly microcrystalline structure is to be understood as meaning that particularly >50 wt % of the wax to be used is a microcrystalline wax. Exclusively microcrystalline wax is employable in particular, which corresponds to a particularly preferred embodiment of the invention.

"Microcrystalline wax" (also called microwax) is an established technical term describing, as will be known, a complex polynary mixture typically including saturated hydrocarbons comprising long-chain linear n-alkanes and, in particular, long-chain branched isoalkanes, and further including alkyl-substituted cycloparaffins and alkyl-substituted and/or naphthene-substituted aromatics, which is typically recovered from the residues of petroleum processing in refineries. Microwaxes contain an elevated fraction of iso- and cyclo-alkanes in contradistinction to paraffin waxes. The fraction of linear n-alkanes is generally distinctly below 40%, for example equal to 20%. The fraction of iso- and cyclo-alkanes is generally distinctly above 60%, for example equal to 80%, both based on a microwax. Microcrystalline wax can if necessary be lightened in colour using various methods. More particularly, microwaxes can be nearly completely freed from any impurities and contraries, for example by means of high-pressure hydrogenation, so microwax as E905 is even an approved food additive in the EU. Microwax has a very fine crystalline structure in contradistinction to trade paraffin, which is coarsely crystalline.

According to its properties, microwaxes are subdividable according to the degree of raffination, in particular into three further classes, namely petrolates, plastically deformable microwaxes and hard microwaxes. Plastically deformable microwaxes are particularly preferable among these. Microwaxes are readily and widely available commercially from various producers, for example from Alpha Wax BV, Netherlands or, for example, from Sasol Wax GmbH, Germany.

In one preferred embodiment of the invention, therefore, the process of the invention employs a (preferably plastically deformable) microwax having a congealing point in the range from 50° C. to 85° C., preferably from 55° C. to 80° C., in particular from 60° C. to 75° C. A particularly preferred embodiment of the invention accordingly employs a (preferably plastically deformable) microwax having a congealing point in the range from 60 to 75° C. This provides a particularly effective way to realize the target of coarsening the cellular structure of the foam without significantly affecting the physical properties of the foam, in particular the compression load deflection.

In principle, the amount of wax to be used in any one particular case is ascertainable by the person skilled in the art by means of a few hands-on tests. However, in one preferred embodiment of the invention, the amount of wax is chosen so as to employ from 0.0001 to 5 parts by weight, preferably from 0.0001 to 1 part by weight, in particular from 0.0001 to 0.1 part by weight, e.g. from 0.0002 to 0.05 part by weight, of wax per 100 parts by weight of polyol, comprehending all polyol components used.

In one particularly preferred embodiment of the invention, therefore, the process of the invention employs a (preferably plastically deformable) microwax having a congealing point in the range from 60° C. to 75° C., wherein the amount of wax is chosen so as to employ from 0.0001 to 5 parts by weight (preferably from 0.0001 to 1 part by weight, in particular from 0.0001 to 0.1 part by weight) of wax per 100 parts by weight of polyol, comprehending all polyol components used.

It has further turned out to be particularly advantageous as regards the homogeneity of the cellular structure to use the wax in a dispersed form where the dispersion medium preferably comprises organic solvents, in particular selected from esters of mono- or polyhydric alcohols, preferably the fatty acid esters of mono- or polyhydric alcohols such as, in particular, glycerol esters or sorbitol esters, and also polyethers, xylene, toluene. A suitable dispersion may preferably contain from 0.1 to <10 wt % (e.g. from 0.2 to 5 wt %) of the wax and at least 90 wt % of dispersion medium. If necessary, the dispersion medium and/or the wax may be heated to prepare the dispersion. To prepare such dispersions, a person skilled in the art may employ any technique known from the prior art.

One very particularly preferred embodiment of the invention accordingly employs a (preferably plastically deformable) microwax having a congealing point in the range from 60° C. to 75° C. in such an amount that, per 100 parts by weight of polyol, comprehending all polyol components used, from 0.0001 to 5 parts by weight (preferably from 0.0001 to 1 part by weight, in particular from 0.0001 to 0.1 part by weight) of wax are employed, the wax being imported in a dispersed form. This procedure is particularly beneficial in order to realize particularly good results for the desired properties of the foam (in particular as regards the coarsening and the homogeneity of the cellular structure).

The waxes to be used according to the present invention are employable as an additive in any known process for production of polyurethane foams, as for example of polyurethane flexible foam, hot-cure flexible foam, rigid foam, ester foam, viscoelastic flexible foam or high-resilience foam (HR foam; also known as cold-cure foam), in particular for production of flexible polyurethane foams.

Traditional processes for production of polyurethane foams are known per se. These may in principle be had recourse to in the context of this invention, provided wax is employed as an additive in the manner of the present invention.

The PUR foam is preferably made by expanding a mixture containing at least one urethane and/or isocyanurate catalyst, at least one blowing agent, at least one isocyanate component and at least one polyol component in the presence of the wax to be employed for the purposes of the present invention.

As well as the components already mentioned, the mixture may include further optional constituents, for example optionally (further) blowing agents, optionally prepolymers, optionally flame retardants and optionally further additives (other than the waxes to be employed in the present invention), for example fillers, emulsifiers, emulsifiers which are based on the reaction of hydroxyl-functional compounds with isocyanate, stabilizers, for example Si-containing and non-Si-containing, especially Si-containing and non-Si-containing organic stabilizers and surfactants, viscosity reducers, dyes, antioxidants, UV stabilizers or antistats. It will be understood that a person skilled in the art seeking to produce the different types of flexible polyurethane foam, i.e. hot-cure, cold-cure or ester flexible polyurethane foams, will select the particular substances needed for this, e.g. isocyanate (prepolymer), polyol, stabilizers, etc., in an appropriate manner to obtain the particular type of flexible polyurethane foam desired.

A number of property rights describing suitable components and processes for producing the different types of flexible polyurethane foam, i.e. hot-cure, cold-cure and also ester flexible polyurethane foams, are indicated hereinbelow and are fully incorporated herein by reference: EP 0152878 A1, EP 0409035 A2, DE 102005050473 A1, DE 19629161 A1, DE 3508292 A1, DE 4444898 A1, EP 1061095 A1, EP 0532939 B1, EP 0867464 B1, EP1683831 A1 and DE102007046860 A1.

Further particulars regarding usable starting materials, catalysts and also auxiliary and added-substance materials are found for example in Kunststoffhandbuch, Volume 7, Polyurethane, Carl-Hanser-Verlag Munich, 1st edition 1966, 2nd edition, 1983 and 3rd edition, 1993.

The compounds, components and additives which follow are mentioned merely by way of example and can be replaced by other substances known to those skilled in the art.

Surfactants employable in the production of flexible polyurethane foams are selectable, for example, from the group comprising nonionic surfactants and/or amphoteric surfactants.

Useful surfactants for the purposes of the present invention also include polymeric emulsifiers such as polyalkyl polyoxyalkyl polyacrylates, polyvinylpyrrolidones and polyvinyl acetates. It is likewise possible to use, as surfactants/emulsifiers, prepolymers which are obtained by reaction of small amounts of isocyanates with polyols (called oligourethanes), and which are preferably present dissolved in polyols.

Stabilizers used may be the substances mentioned in the prior art. The compositions of the present invention may advantageously contain one or more stabilizers. They are in particular silicon compounds comprising carbon atoms and preferably selected from polysiloxanes, organomodified polysiloxanes, polyether-modified polysiloxanes and polyether-polysiloxane copolymers.

Useful silicon compounds comprising one or more carbon atoms include the substances mentioned in the prior art. Preference is given to using such silicon compounds as are particularly suitable for the particular type of foam. Suitable siloxanes are described for example in the following references: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. The silicon compounds may be obtained as described in the prior art. Suitable examples are described, for instance, in U.S. Pat. No. 4,147,847, EP 0493836 and U.S. Pat. No. 4,855,379.

Particularly preferred silicon compounds are of formula (I),

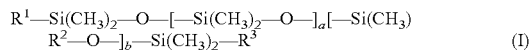

(I)

where
$R^2$ same or different $=-(CH_2)_x-O-(CH_2-CHR^4-O-)_y-R^5$ or a $C_8$ to $C_{22}$ alkyl moiety,
$R^1$ and $R^3$ same or different $=-CH_3$ or $R^2$, provided at least one $R^1$ or $R^3$ moiety is equal to $R^2$,
$a+b+2=10$ to 150, preferably 25 to 120,
$b=0$ to 25, preferably 0.5 to 15,
$x=3$ to 10, preferably 3,
$y=1$ to 30, preferably 5 to 25,
$R^4$ in each occurrence is the same or different and represents H, $-CH_3$, $-CH_2CH_3$ or phenyl,
$R^5$ in each occurrence is the same or different and represents H, alkyl or acyl, preferably H, $CH_3$ or $COCH_3$.

It may be advantageous when in the siloxane compounds of formula (I) at least 50 mol % of the $R^4$ moieties=H, preferably at least 90 mol % of the $R^4$ moieties=H. It may additionally be advantageous when in the siloxane compounds of formula (I) at least 5 mol % of the $R^4$ moieties=methyl, preferably at least 10 mol % of the $R^4$ moieties=methyl. Preference is given to using those formula (I) siloxane compounds where at least 50 mol % of the $R^4$ moieties=H and where at least 10 mol % of the $R^4$ moieties=methyl. It is preferable for there to be formula (I) siloxane compounds where at least 90 mol % of the $R^4$ moieties=H and at least 5 mol % of the $R^4$ moieties=methyl.

Particular preference is given to those formula (I) siloxane compounds where at least 5 mol % of the $R^5$ moieties=alkyl or acyl, preferably $CH_3$ or $COCH_3$, more preferably methyl.

It may be advantageous when in the siloxane compounds of formula (I) the preferred $R^4$ and $R^5$ moieties are present in the above-stated mol percent ranges.

In particularly preferred siloxane compounds of formula (I), the a/b quotient is above 7, preferably above 8, more preferably above 10.

It may be advantageous for at least 10% by equivalence (and at most 50% by equivalence) of the $R^2$ radicals in the siloxane compounds of formula (I) to be alkyl groups of 8 to 22 carbon atoms (based on the overall number of $R^2$ radicals in the siloxane compound).

From 0.05 to 10 parts by mass of silicon compounds may preferably be used per 100 parts by mass of polyol components.

It is especially when the aforementioned silicon compounds are used in combination with the wax to be used according to the present invention that very good results are made possible with regard to the foams sought according to the present invention.

Biocides used may be commercial products such as chlorophene, benzisothiazolinone, hexahydro-1,3,5-tris(hydroxyethyl-s-triazine), chloromethylisothiazolinone, methylisothiazolinone or 1,6-dihydroxy-2,5-dioxohexane, which are known by the trade names BIT 10, Nipacide BCP, Acticide MBS, Nipacide BK, Nipacide CI, Nipacide FC.

PUR foam is often produced by mixing all the components other than the polyols and isocyanates into an activator mixture prior to foaming. This activator mixture may then contain inter alia the waxes to be used according to the present invention and also stabilizers, catalysts or catalyst combinations, the blowing agent, for example water, and also any further additives, such as flame retardation, colour, biocides, etc., depending on the recipe of the flexible polyurethane foam. An activator mixture of this type may also be a composition according to the present invention.

The blowing agents are distinguished between chemical and physical blowing agents. The chemical blowing agents include, for example, water, the reaction of which with the isocyanate groups leads to formation of $CO_2$. The apparent density of the foam is controllable via the admixed amount of water, the preferred amounts of water used being between 0.5 and 7.5 parts, based on 100.0 parts of polyol. It is further alternatively and/or else additionally possible to employ physical blowing agents, such as carbon dioxide, acetone, hydrocarbons, such as n-pentane, isopentane, cyclopentane or cyclohexane, halogenated hydrocarbons, such as methylene chloride, tetrafluoroethane, pentafluoropropane, heptafluoropropane, pentafluorobutane, hexafluorobutane and/or dichloromonofluoroethane. The amount of physical blowing agent here is preferably in the range between 1 to 20 parts by weight, in particular 1 to 15 parts by weight, while the amount of water is preferably in the range between 0.5 to 10 parts by weight, in particular 1 to 5 parts by weight. Carbon dioxide is preferred among the physical blowing agents, and is preferably used in combination with water as chemical blowing agent.

A flexible polyurethane foam is preferably produced by reacting a mix, mixture or blend of polyol, di- or polyfunctional isocyanate, wax to be used according to the invention, amine catalyst, potassium compound, organozinc compound and/or organotin compound or other metal-containing catalysts, stabilizer, blowing agent, preferably water to form $CO_2$ and, if necessary, addition of physical blowing agents, optionally under admixture of flame retardants, UV stabilizers, colour pastes, biocides, fillers, crosslinkers or other customary processing auxiliaries. The mix, mixture or blend may likewise be a composition of the present invention.

Isocyanates used may be organic isocyanate compounds containing at least two isocyanate groups. In general, useful isocyanates are the aliphatic, cycloaliphatic, araliphatic and preferably aromatic polyfunctional isocyanates known per se. Isocyanates are more preferably used at from 60 to 140 mol %, relative to the sum total of isocyanate-consuming components.

Specific examples include the following: alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates such as cyclohexane 1,3- and 1,4-diisocyanates and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic di- and polyisocyanates, for example tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. Organic di- and polyisocyanates can be used individually or as mixtures thereof.

It is also possible to use isocyanates which have been modified by the incorporation of urethane, uretdione, isocyanurate, allophanate and other groups, called modified isocyanates.

Organic polyisocyanates have been found to be particularly useful and are therefore employed with preference: tolylene diisocyanate, mixtures of diphenylmethane diisocyanate isomers, mixtures of diphenylmethane diisocyanate and polyphenylpolymethyl polyisocyanate or tolylene diisocyanate with diphenylmethane diisocyanate and/or polyphenylpolymethyl polyisocyanate or what are called prepolymers.

It is possible to use either TDI (tolylene 2,4- and 2,6-diisocyanate isomer mixture) or MDI (diphenylmethane 4,4'-diisocyanate). What is called "crude MDI" or "polymeric MDI" contains, as well as the 4,4' isomers, also the 2,4' and 2,2' isomers, and also higher polycyclic products. "Pure MDI" refers to bicyclic products composed predominantly of 2,4' and 4,4' isomer mixtures or prepolymers thereof. Further suitable isocyanates are detailed in patent specifications DE 444898 and EP 1095968, to which reference is made here in full.

Crosslinkers refer to low molecular weight polyfunctional compounds that are reactive toward isocyanates. Suitable examples are hydroxyl- or amine-terminated substances such as glycerol, triethanolamine (TEOA), diethanolamine (DEOA) and trimethylolpropane. The use concentration is typically between 0.1 and 5 parts, based on 100 parts polyol, according the formulation, but may also differ therefrom. Crude MDI used in mould foaming likewise performs a crosslinking function. The level of low molecular weight crosslinkers is accordingly reducible in proportion to the increasing amount of crude MDI.

Not only slab but also mould foaming may be practised according to the present invention. Any conventional methods of producing flexible polyurethane foams are usable. For example, the foaming operation can be effected either in the horizontal or in the vertical direction, in batchwise or continuous systems. The additive formulations according to the present invention are similarly useful for $CO_2$ technology. Use in low-pressure and high-pressure machines is possible, in which case the formulations of the invention can be metered directly into the mixing chamber or else are added upstream of the mixing chamber to one of the components which subsequently pass into the mixing chamber. The addition can also be effected in the raw material tank.

Any known polyol compounds, including in particular those based on renewable raw materials, are employable as polyol compounds.

These may, for example, be polyether polyols or polyester polyols which typically bear 2 to 6 OH groups per molecule and, as well as carbon, hydrogen and oxygen, may also contain heteroatoms such as nitrogen, phosphorus or halogens; preference is given to using polyether polyols. Polyols of this kind can be prepared by known processes, for example by anionic polymerization of alkylene oxides in the presence of alkali metal hydroxides or alkali metal alkoxides as catalysts, and with addition of at least one starter molecule containing 2 to 3 reactive hydrogen atoms in bound form, or by cationic polymerization of alkylene oxides in the presence of Lewis acids, for example antimony pentachloride or boron fluoride etherate, or by double metal cyanide catalysis. Suitable alkylene oxides contain 2 to 4 carbon atoms in the alkylene radical. Examples are tetrahydrofuran, 1,3-propylene oxide, 1,2- or 2,3-butylene oxide; preference is given to using ethylene oxide and/or 1,2-propylene oxide. Styrene oxide is also employable in particular. The alkylene oxides may be used individually, in alternation or as mixtures. Useful starter molecules include water and 2- or 3-hydric alcohols, such as ethylene glycol, 1,4-butanediol, 1,2-propanediol, 1,3-propanediol, diethylene glycol, dipropylene glycol, glycerol, trimethylolpropane, etc. Polyfunctional polyols such as, for example, sugars are also employable as starters. The polyether polyols, preferably polyoxypropylenepolyoxyethylene polyols, advantageously have a functionality of 2 to 8 and number-averaged molecular weights in the range of advantageously 500 to 8000, preferably 800 to 4500. Further polyols are known to those skilled in the art and can be found, for example, in EP-A-0 380 993 or U.S. Pat. No. 3,346,557, which are fully incorporated herein by reference.

Moulded and high-resilience flexible foams are preferably produced by employing two- and/or three-functional polyether alcohols preferably having above 50 mol % of primary hydroxyl groups, based on the sum total of hydroxyl groups, in particular those having an ethylene oxide block at the chain end or those based exclusively on ethylene oxide.

Slabstock flexible foams are preferably produced by employing 2- and/or 3-functional polyether alcohols having secondary hydroxyl groups, preferably above 80 mol %, in particular those having a propylene oxide block or random propylene oxide and ethylene oxide block at the chain end, or those based exclusively on propylene oxide blocks.

Useful natural oil polyols (NOPs), i.e. polyol components based on renewable raw materials, include, for example, those described in the patent documents WO 2004/020497, US 2006/0229375, WO 2009/058367, WO 2006/094227, WO 2004/096882, US 2002/0103091, WO2006/116456 and EP 1678232. Preferred NOPs are obtainable on the basis of, for example, castor oil, soybean oil, peanut oil, rapeseed oil, palm oil or sunflower oil. The aforementioned plant oils bar castor oil do not contain any hydroxyl groups. The hydroxyl group needed for polyurethane formation is introducible in various ways, some of which are cited herein by way of example: Ozonolysis with subsequent hydrogenation [Petrovic Z S, Zhang W, Javni I, Biomacromolecules 2005; 6: 713-9]; epoxidation with subsequent ring opening (WO 2009/058367; U.S. Pat. No. 6,433,121); hydroformylation with subsequent hydrogenation (WO2004096744); air oxidation with subsequent ring opening or hydroformylation (US 2006/0229375); microbiological conversion into OH-functional polyols [Hou C T, Adv. Appl. Microbiol. 199541 1-23]. The OH-functionalized biopolyols are employable in the manufacture of polyurethane foams either directly or following an alkoxylation. The alkoxylation of OH-functionalized biopolyols may be effected by the method of alkaline alkoxylation or by use of DMC catalysts.

A further class of polyols are those which are obtained as prepolymers via reaction of polyol with isocyanate in a molar ratio of 100:1 to 5:1, preferably 50:1 to 10:1. Such prepolymers are preferably used in the form of a solution in polyol, and the polyol preferably corresponds to the polyol used for preparing the prepolymers.

Yet a further class of polyols is that of the so-called filled polyols (polymer polyols). These contain dispersed solid organic fillers up to a solids content of 40% by weight or more. The following are among those which may be used:

SAN polyols: These are highly reactive polyols containing a dispersed copolymer based on styrene-acrylonitrile (SAN).

PUD polyols: These are highly reactive polyols containing polyurea, likewise in dispersed form.

PIPA polyols: These are highly reactive polyols containing a dispersed polyurethane, for example formed by in situ reaction of an isocyanate with an alkanolamine in a conventional polyol.

The solids content, which is preferably between 5% and 40% by weight, based on the polyol, depending on the application, is responsible for improved cell opening, and so the polyol becomes foamable in a controlled fashion, in particular with TDI, and no shrinkage of the foams occurs. The solids content thus acts as an essential processing aid. A further function is to control the hardness via the solids content, since higher solids contents bring about a higher hardness on the part of the foam.

The formulations with solids-containing polyols have distinctly lower intrinsic stability and therefore tend also to additionally require physical stabilization in addition to the chemical stabilization due to the crosslinking reaction.

Depending on the solids contents of the polyols, these are used alone or in a blend with the abovementioned unfilled polyols.

Blowing agents used may be the known blowing agents. Preferably, in the production of the polyurethane foam, water, methylene chloride, pentane, alkanes, halogenated alkanes, acetone and/or carbon dioxide are used as blowing agents.

The water can be added directly to the mixture or else be added to the mixture as a secondary component of one of the reactants, for example of the polyol component, together with the latter.

In addition to physical blowing agents and any water, it is also possible to use other chemical blowing agents which react with isocyanates to evolve a gas, an example being formic acid.

Catalysts may be present in the mixture to catalyse the gel reaction (i.e. the reaction between isocyanate and polyol), the blowing reaction (i.e. the reaction between isocyanate and water) or the di- or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N,N-dimethylhexadecylamine, oxaazasilinane, N-ethylmorpholine, tris(dimethylaminopropyl)hexahydro-1,3,5-triazine, N,N-dimethylaminoethanol, dimethylaminoethoxyethanol and bis(dimethylaminoethyl) ether, zinc compounds and/or salts, tin compounds and/or salts, preferably tin ricinoleate, and potassium salts such as potassium acetate and potassium 2-ethylhexanoate. Preference is given to using catalysts comprising tin ricinoleate and/or N,N-dimethylhexadecylamine.

The amounts in which catalysts are suitably used depend on the type of catalyst and typically range from 0.02 to 5 pphp (=parts by weight based on 100 parts by weight of polyol).

The process of the present invention provides a polyurethane foam, in particular a flexible polyurethane foam, notable in particular for having, as set out above, a coarsened cellular structure such that, therefore, an increase in cell size and hence a reduction in the number of cells per unit length are observable, for example under the microscope, as compared with polyurethane foam otherwise produced in the same way except without the wax.

The present invention accordingly further provides a polyurethane foam obtainable by a process according to the present invention, as described above.

The polyurethane foam may more particularly comprise a polyurethane flexible foam, hot-cure flexible foam, rigid foam, ester foam, viscoelastic flexible foam or high-resilience foam (HR foam; cold-cure foam), in particular a slabstock HR foam, a slabstock flexible foam or a moulded HR foam.

It is especially in relation to the production of HR slabstock foam that the present invention provides exceedingly good results as regards coarsening the foam.

In one particularly preferred embodiment, therefore, the polyurethane foam made according to the present invention is an HR slabstock foam.

The present invention further provides for the use of waxes having a congealing point in the range from 40° C. to 90° C. as an additive in the manufacture of polyurethane foams to coarsen the foam structure.

The present invention yet further provides for the use of waxes having a congealing point in the range from 40° C. to 90° C. as an additive in the manufacture of polyurethane foams to enhance the ability of the resulting foam to remove moisture, in particular water vapour.

The present invention likewise further provides for the use of waxes having a congealing point in the range from 40° C. to 90° C. as an additive in the manufacture of polyurethane foams to enhance the ability of the resulting foam to remove heat.

As regards preferred embodiments of these aforementioned uses, the preceding description is referenced particularly with respect to the wax to be used.

The invention further provides a polyurethane foam production composition comprising at least one urethane and/or isocyanurate catalyst, at least one blowing agent, at least one isocyanate component and at least one polyol component, while wax having a congealing point in the range from 40° C. to 90° C. is present as an additive.

The notion of composition in this sense also encompasses multicomponent compositions wherein two or more components have to be mixed to produce a chemical reaction leading to polyurethane foam production. The notion of composition in this sense encompasses in particular the mix, mixture or blend of at least one urethane and/or isocyanurate catalyst, at least one blowing agent, at least one isocyanate component and at least one polyol component and also wax having a congealing point in the range from 40° C. to 90° C.

A preferred composition according to the invention for producing polyurethane foam can contain polyol, for example in amounts of 25 to 75 wt %, water, for example in amounts of 1 to 5 wt %, catalyst, for example in amounts of 0.05 to 2 wt %, physical blowing agent, for example in amounts of 0 to 25 wt % (e.g. 0.1 to 25 wt %), stabilizers (such as, for example, silicon-containing and non-silicon-containing, in particular silicon-containing and non-silicon-containing organic stabilizers and surfactants), for example in amounts of 0.3 to 5 wt %, isocyanate, for example in amounts of 20 to 50 wt %, and the wax to be used according to the present invention, for example in amounts of 0.00001 to 1 wt % (preferably 0.00005 to 0.5 wt %).

As regards preferred embodiments of these aforementioned compositions, the preceding description is referenced particularly with respect to the wax to be used.

With the inventive polyurethane foam, it is possible to obtain articles including or consisting of this polyurethane foam. The polyurethane foams of the present invention are especially useful in the furniture, mattress, vehicle, bagmaking, footwear and textile industries, but also in the home and in the technical sector. Examples of corresponding articles include furniture cushioning, refrigerator insulation, spray foams, (metal-faced) composite elements for (building) insulation, mattresses, pillows, automotive seats or automotive headrests. It is especially mattresses, cushioning, cushions and pillows, i.e. articles where moisture transfer is important, which are particularly suitable.

The subject-matter of the present invention is elucidated in detail hereinafter with reference to examples, without any intention that the subject-matter of the invention be linked to these illustrative embodiments.

EXAMPLES

The raw materials mentioned in Table 1 were used to produce all the foams referred to hereinafter.

TABLE 1

| | Raw materials for producing the foams |
|---|---|
| polyol 1 | trifunctional polyetherol, MW 3500, OHN 35, BAYER AG |
| polyol 2 | trifunctional polyetherol, OHN 29, 20% polyurea dispersion, BAYER AG |
| polyol 3 | trifunctional polyetherol, OHN 48, MW 3500, Dow Chemicals |
| polyol 4 | trifunctional polyetherol, OHZ 20, 45% styrene-acrylonitrile filled, DOW Chemicals |
| polyol 5 | trifunctional polyetherol, OHN 32, Bayer AG |
| polyol 6 | trifunctional polyetherol, OHN 30, 15 wt % styrene-acrylonitrile filled, DOW Chemicals |
| catalyst 1 | Tegoamin BDE (70% bis(2-dimethylaminoethyl) ether in dipropylene glycol), Evonik Industries AG |
| catalyst 2 | Tegoamine DEOA 85 (diethanolamine 85% in water), Evonik Industries AG |
| catalyst 3 | Tegoamin 33 (33% triethylenediamine in dipropylene glycol), Evonik Industries AG |
| catalyst 4 | triethanolamine 99% Evonik Industries AG |
| catalyst 5 | Tegoamin DMEA (dimethylethanolamine), Evonik Industries AG |
| catalyst 6 | Kosmos 29 (tin octoate), Evonik Industries AG (10% solution in polyol 1 or 3 or 6) |
| catalyst 7 | Tegoamin B 75 (75% Tegoamin 33, 25% Tegoamin BDE), Evonik Industries AG |
| crosslinker 1 | glycerol, technical grade |
| crosslinker 2 | Ortegol 204, (delayed action aqueous crosslinker preparation), Evonik Industries AG |
| silicone stabilizer 1 | Tegostab BF 2470, Evonik Industries AG (preparation of organomodified polysiloxanes) |
| silicone stabilizer 2 | Tegostab B 8680, Evonik Industries AG (preparation of organomodified polysiloxanes) |
| silicone stabilizer 3 | Tegostab B 8724 LF2, Evonik Industries AG (preparation of organomodified polysiloxanes) |
| silicone stabilizer 4 | Tegostab B 8715 LF2, Evonik Industries AG (preparation of organomodified polysiloxanes) |
| silicone stabilizer 5 | Tegostab B 8742 LF2, Evonik Industries AG (preparation of organomodified polysiloxanes) |
| silicone stabilizer 6 | Tegostab B 8707 LF2, Evonik Industries AG (preparation of organomodified polysiloxanes) |
| mix 1 | wax dispersion: Microwax with congealing point in range from 60 to 75° C. dispersed in sorbitan ester |
| Isocyanate 1 | tolylene diisocyanate, TDI 80, (80% of 2,4-isomers, 20% of 2,6-isomer), Bayer MaterialScience AG |
| Isocyanate 2 | VT 60/40, (60% TDI tolylene diisocyanate, 40% MDI Desmodur 44V20), Bayer MaterialScience AG |

Example 1: As Applied to HR Slabstock Foam

The formulation specified hereinbelow in table 2 was used to do a performance comparison (Comp) with the wax additive of the invention (Inv).

TABLE 2

Formulation for production of HR slabstock foam
(parts by weight per 100 parts by weight of polyol)

| | Example | | |
|---|---|---|---|
| | Comp 1 | Inv 1 | Inv 2 |
| polyol 1 | 60 | 60 | 60 |
| polyol 2 | 40 | 40 | 40 |
| water, total | 4.20 | 4.20 | 4.20 |
| water separate | 3.78 | 3.78 | 3.78 |
| isocyanate index | 95.5 | 95.5 | 95.5 |

TABLE 2-continued

Formulation for production of HR slabstock foam
(parts by weight per 100 parts by weight of polyol)

|  | Example | | |
| --- | --- | --- | --- |
|  | Comp 1 | Inv 1 | Inv 2 |
| isocyanate 1 | 47.7 | 47.7 | 47.7 |
| catalyst 1 | 0.07 | 0.07 | 0.07 |
| catalyst 2 | 1.73 | 1.73 | 1.73 |
| catalyst 3 | 0.5 | 0.5 | 0.5 |
| mix 1 | 0 | 0.05 | 0.1 |
| silicone stabilizer 2 | 1.0 | 1.0 | 1.0 |

The foams were produced in the known manner by mixing all the components bar the isocyanate in a beaker and then admixing the isocyanate at a high stirring speed. The reaction mixture was then poured into an open 27 cm×27 cm×27 cm metal box lined with paper. The foamed material produced in the process had the physical properties described hereinafter.

To quantify the cellular structure the foam slab was cut open and the uppermost plane of the cut surface was coloured with a black pen. A magnifying glass was used to count the number of cells within a centimeter by eye.

The force-to-crush (FTC) was also measured in each case. The foams were compressed 10 times down to 50% of their height. The 1st measurement (FTC 1 in newtons) is a measure of the open-cell content of the foam. The foam was then completely crushed open (manually) in order for the 11th measurement (FTC 11 in newtons) to give the hardness of the crushed-open foam. The 1-11 value is a measure of the openability of a foam and is the arithmetic difference between an as-produced, still undamaged foam and the completely opened foam.

Table 3 summarizes the comparative and inventive examples. The following mechanical properties were also measured:
40% compression load deflection to DIN EN ISO 3386
compression set to DIN EN ISO 1856
Airflow to DIN EN ISO 7231
ball rebound resilience to DIN EN ISO 8307
apparent density kg/m3 to DIN EN ISO 845
wet compression set by Toyota method TSM7100 G, Article 4.8.2 (Compression Set after Humidity Resistance) page 12
porosity (backpressure method): (EN ISO 29053)

TABLE 3

Results for physical properties of foams

|  | Comp 1 | Inv 1 | Inv 2 |
| --- | --- | --- | --- |
| density [kg/m$^3$] | 26.5 | 25.9 | 25.4 |
| compression load deflection at 40% compression/deformation/kPa | 1.8 | 1.8 | 1.8 |
| compression set/% [70%, 22 h, 70° C.] | 42.0 | 41.3 | 27.3 |
| wet compression set/% [50%, 22 h, 50° C., 95% RH] | 28.7 | 27.3 | 28.0 |
| cells/cm | 11 | 10 | 9 |
| FTC1/N | 150 | 161 | 171 |
| FTC11/N | 64 | 67 | 68 |
| FTC 1-11/N | 86 | 94 | 103 |
| airflow/scfm | 0.36 | 0.42 | 0.40 |
| rebound resilience/% | 65 | 65 | 65 |

The density measurement results show that no significant density fluctuations are incurred. Compression load deflection is likewise unaffected. The number of cells per centimeter decreases when the wax additive is employed, which corresponds to the foam becoming coarser.

Example 2: As Applied to HR Slabstock Foam

The foam formulation specified hereinbelow in table 4 was used to do a performance comparison (Comp) with the additive mix of the invention (Inv).

TABLE 4

Formulation for production of HR slabstock foam
(parts by weight per 100 parts by weight of polyol)

|  | Example | | | |
| --- | --- | --- | --- | --- |
|  | Comp 2 | Inv 3 | Inv 4 | Inv 5 |
| polyol 1 | 100 | 100 | 100 | 100 |
| isocyanate index | 101 | 101 | 101 | 101 |
| isocyanate 1 | 41.02 | 41.02 | 41.02 | 41.02 |
| water, total | 3.0 | 3.0 | 3.0 | 3.0 |
| water, separate | 2.18 | 2.18 | 2.18 | 2.18 |
| catalyst 1 | 0.1 | 0.1 | 0.1 | 0.1 |
| catalyst 2 | 0.58 | 0.58 | 0.58 | 0.58 |
| catalyst 3 | 0.4 | 0.4 | 0.4 | 0.4 |
| catalyst 6 | 0.15 | 0.15 | 0.15 | 0.15 |
| mix 1 | 0 | 0.05 | 0.1 | 0.2 |
| crosslinker 2 | 3.0 | 3.0 | 3.0 | 3.0 |
| silicone stabilizer 3 | 1.0 | 1.0 | 1.0 | 1.0 |

The foams were produced in the known manner by mixing all the components bar the isocyanate in a beaker and then admixing the isocyanate at a high stirring speed. The reaction mixture was then poured into an open 27 cm×27 cm×27 cm metal box lined with paper. The foamed material produced in the process had the physical properties described hereinafter.

Cellular structure and FTC were quantified by the above procedure.

Table 5 summarizes the comparative and inventive examples.

TABLE 5

Results for physical properties of foams

|  | Comp 2 | Inv 3 | Inv 4 | Inv 5 |
| --- | --- | --- | --- | --- |
| density [kg/m$^3$] | 32.2 | 32.1 | 32.0 | 31.9 |
| compression load deflection at 40% compression/deformation/kPa | 2.0 | 2.0 | 2.1 | 2.2 |
| compression set/% [70%, 22 h, 70° C.] | 18.0 | 11.3 | 6.0 | 4.0 |
| wet compression set/% [50%, 22 h, 50° C., 95% RH] | 20.7 | 19.3 | 16.7 | 19.3 |
| cells/cm | 11 | 10 | 9 | 8 |
| FTC1/N | 188 | 187 | 174 | 161 |
| FTC11/N | 68 | 70 | 69 | 73 |
| FTC 1-11/N | 120 | 117 | 105 | 88 |
| airflow/scfm | 0.47 | 0.45 | 0.56 | 0.47 |
| rebound | 65 | 65 | 65 | 65 |

The density measurement results show that no significant density fluctuations are incurred. Compression load deflection is likewise not/scarcely affected. The number of cells per centimeter decreases with an increasing amount used for mix 1, which corresponds to the foam becoming coarser.

Example 3: As Applied to Conventional Flexible Slabstock Foam

The foam formulation specified hereinbelow in table 6 was used to do a performance comparison (Comp) with the additive mix of the invention (Inv).

TABLE 6

Formulation for production of flexible slabstock foam
(parts by weight per 100 parts by weight of polyol)

| | Example | | | | |
|---|---|---|---|---|---|
| | Comp 3 | Inv 6 | Inv 7 | Inv 8 | Inv 9 |
| polyol 3 | 100 | 100 | 100 | 100 | 100 |
| isocyanate index | 110 | 110 | 110 | 110 | 110 |
| isocyanate 1 | 40.10 | 40.10 | 40.10 | 40.10 | 40.1 |
| water, total | 3.0 | 3.0 | 3.0 | 3.0 | 3.0 |
| catalyst 6 | 0.15 | 0.15 | 0.15 | 0.15 | 0.11 |
| catalyst 7 | 0.15 | 0.15 | 0.15 | 0.15 | 0.15 |
| mix 1 | 0 | 0.5 | 1.0 | 2.0 | 2.0 |
| silicone stabilizer 1 | 0.8 | 0.8 | 0.8 | 0.8 | 0.8 |

The foams were produced in the known manner by mixing all the components bar the isocyanate in a beaker and then admixing the isocyanate at a high stirring speed. The reaction mixture was then poured into an open 27 cm×27 cm×27 cm metal box lined with paper. The foamed material produced in the process had the physical properties described hereinafter.

Cellular structure was quantified by the above procedure.

TABLE 7

Results for physical properties of foams

| | Comp 3 | Inv 6 | Inv 7 | Inv 8 | Inv 9 |
|---|---|---|---|---|---|
| foam density [kg/m$^3$] | 30.3 | 30.3 | 30.8 | 31.0 | 31.8 |
| compressive strength (compressive stress at 40% compression)/deformation in kPa | 4.2 | 4.2 | 3.9 | 4.2 | 3.8 |
| compression set/% [70%, 22 h, 90° C.] | 0.0 | 0.0 | 0.0 | 0.0 | 0.0 |
| wet set/% [50%, 22 h, 50° C., 95% RH] | 4.0 | 4.0 | 4.0 | 4.0 | 0 |
| cells/cm | 13.5 | 13 | 13 | 12.5 | 12.0 |
| airflow/scfm | 3.01 | 2.55 | 2.31 | 1.84 | 2.77 |
| rebound resilience/% | 50 | 50 | 50 | 50 | 50 |
| porosity/mm water column | 26.2 | 30.2 | 33.6 | 50.0 | 23.2 |

The density measurement results show that no significant density fluctuations are incurred. Compression load deflection is likewise barely affected. The number of cells per centimeter shows a decreasing tendency with increasing amount of mix 1 used, which corresponds to the foam becoming coarser. It is additionally noted that, as the proportion of mix 1 increases, the closed-cell content also increases slightly, as evidenced by the porosity. The open-cell nature of the foam is restorable by slightly adjusting the foam formulation (Inv 9).

Example 4: As Applied to HR Moulded Foam with MDI/TDI

The foam formulation specified hereinbelow in table 8 was used to do a performance comparison (Comp) with the additive mix of the invention (Inv).

TABLE 8

Formulation for production of HR moulded foam
(parts by weight per 100 parts by weight of polyol)

| | Example | | | |
|---|---|---|---|---|
| | Comp 4 | Inv 10 | Inv 11 | Inv 12 |
| polyol 1 | 100 | 100 | 100 | 100 |
| isocyanate index | 102 | 102 | 102 | 102 |
| isocyanate 2 | 46.24 | 46.24 | 46.24 | 46.24 |
| water, total | 3.0 | 3.0 | 3.0 | 3.0 |
| catalyst 3 | 0.6 | 0.6 | 0.6 | 0.6 |
| catalyst 4 | 2.0 | 2.0 | 2.0 | 2.0 |
| catalyst 5 | 0.2 | 0.2 | 0.2 | 0.2 |
| mix 1 | 0 | 0.05 | 0.1 | 0.2 |
| silicone stabilizer 4 | 0.6 | 0.6 | 0.6 | 0.6 |

The foams were produced in the known manner by mixing all the components bar the isocyanate in a beaker and then admixing the isocyanate at a high stirring speed. The reaction mixture was then poured into a cuboid-shaped mould of aluminium in the dimensions 40×40×10 cm, which had been heated to 40° C., and the material was allowed to cure for 10 minutes.

FTC and the number of cells per centimeter were quantified as above.

TABLE 9

Results for physical properties of foams

| | Comp 4 | Inv 10 | Inv 11 | Inv 12 |
|---|---|---|---|---|
| foam density [kg/m$^3$] | 46.0 | 46.1 | 46.0 | 46.1 |
| compressive strength (compressive stress at 40% compression)/deformation in kPa | 2.9 | 2.9 | 3.0 | 3.3 |
| compression set/% [70%, 22 h, 70° C.] | 0.0 | 0.0 | 0.0 | 0.0 |
| wet compression set/% [50%, 22 h, 50° C., 95% RH] | 0.0 | 0.0 | 0.0 | 0.0 |
| cells/cm | 10 | 9 | 8 | 5.5 |
| FTC1/N | 1047 | 864 | 716 | 542 |
| FTC11/N | 114 | 106 | 125 | 129 |
| FTC 1-11/N | 933 | 758 | 591 | 413 |
| rebound resilience/% | 73 | 72 | 71 | 70 |

The density measurement results show that no significant density fluctuations are incurred. Compression load deflection is likewise only affected minimally. The number of cells per centimeter exhibits a distinct decrease with an increasing amount used for mix 1, which corresponds to the foam becoming coarser. It is additionally noted that there is a significant increase in the open-cell content with an increasing proportion for mix 1, as clearly indicated by FTC 1.

(High FTC=high closed-cell content, low FTC=high open-cell content)

Example 5: As Applied to HR Moulded Foam with TDI

The foam formulation specified hereinbelow in table 10 was used to do a performance comparison (Comp) with the additive mix of the invention (Inv).

TABLE 10

Formulation for production of HR moulded foam
(parts by weight per 100 parts by weight of polyol)

|  | Example | | | |
|---|---|---|---|---|
|  | Comp 5 | Inv 13 | Inv 14 | Inv 15 |
| polyol 4 | 26.67 | 26.67 | 26.67 | 26.67 |
| polyol 5 | 73.33 | 73.33 | 73.33 | 73.33 |
| isocyanate index | 98 | 98 | 98 | 98 |
| isocyanate 1 | 46.3 | 46.3 | 46.3 | 46.3 |
| water, total | 3.98 | 3.98 | 3.98 | 3.98 |
| water, separate | 3.83 | 3.83 | 3.83 | 3.83 |
| catalyst 1 | 0.06 | 0.06 | 0.06 | 0.06 |
| catalyst 2 | 1.0 | 1.0 | 1.0 | 1.0 |
| catalyst 3 | 0.41 | 0.41 | 0.41 | 0.41 |
| crosslinker 1 | 0.6 | 0.6 | 0.6 | 0.6 |
| mix 1 | 0 | 0.1 | 0.2 | 0.3 |
| silicone stabilizer 5 | 0.7 | 0.7 | 0.7 | 0.7 |

The foams were produced in the known manner by mixing all the components bar the isocyanate in a beaker and then admixing the isocyanate at a high stirring speed. The reaction mixture was then poured into a cuboid-shaped mould in the dimensions 40×40×10 cm, which had been heated to 67° C., and the material was allowed to cure for 6 minutes.

FTC and the number of cells per centimeter were quantified as above.

TABLE 11

Results for physical properties of foams

|  | Comp 5 | Inv 13 | Inv 14 | Inv 15 |
|---|---|---|---|---|
| foam density [kg/m³] | 33.1 | 32.7 | 32.9 | 32.8 |
| compressive strength (compressive stress at 40% compression)/deformation in kPa | 3.0 | 2.9 | 3.0 | 3.1 |
| compression set/% [70%, 22 h, 70° C.] | 6.4 | 5.6 | 1.6 | 0.0 |
| wet compression set/% [50%, 22 h, 50° C., 95% RH] | 28.0 | 31.2 | 27.2 | 22.4 |
| cells/cm | 15 | 14 | 11 | 9 |
| FTC1/N | 1927 | 1975 | 2038 | 1767 |
| FTC11/N | 158 | 168 | 180 | 181 |
| FTC 1-11/N | 1769 | 1807 | 1858 | 1586 |
| rebound resilience/% | 60 | 58 | 54 | 50 |

The density measurement results show that no significant density fluctuations are incurred. Compression load deflection is not adversely affected. The number of cells per centimeter exhibits a distinct decrease with an increasing amount used for mix 1, which corresponds to the foam becoming coarser. It is additionally noted that there is an increase in the open-cell content with an increasing proportion for mix 1, as clearly indicated by FTC 1.

Example 6: As Applied to HR Slabstock Foam (Machine Foams)

Foam slabs were produced on a low-pressure foaming machine from Polytec EMC type DG 107 in an otherwise customary manner. The foaming machine was operated with the following parameters:
Output of A-component (polyol mixture): 2.4 kg/min
Pump pressure for polyol: 15 bar
Output for B-component (isocyanate): 0.66 kg/min
Pump pressure for isocyanate: 10 bar
Rotary speed: 3000 rpm:
Process admission pressure 5.5 bar The foam slabs were produced using the formulation itemised in table 12. The three foaming processes were each carried out by mixing all the raw materials bar the isocyanate with each other and filling the mixture as the polyol mixture into the stock reservoir container of the machine. This polyol mixture was stirred/mixed with the isocyanate in the mixing head in the particular mixing ratio. Example Comp 6 is the comparative test to Inventive Examples Inv 16 and Inv 17.

TABLE 12

Formulation for production of HR slabstock foam
(parts by weight per 100 parts by weight of polyol)

|  | Example | | |
|---|---|---|---|
|  | Comp 6 | Inv 16 | Inv 17 |
| polyol 6 | 100 | 100 | 100 |
| isocyanate index | 105 | 105 | 105 |
| isocyanate 1 | 28.5 | 28.5 | 28.5 |
| water, total | 2.00 | 2.00 | 2.00 |
| water, separate | 1.79 | 1.79 | 1.79 |
| catalyst 1 | 0.05 | 0.05 | 0.05 |
| catalyst 2 | 1.41 | 1.41 | 1.41 |
| catalyst 3 | 0.15 | 0.15 | 0.15 |
| catalyst 6 | 0.15 | 0.15 | 0.15 |
| mix 1 | 0 | 0.075 | 0.15 |
| silicone stabilizer 6 | 0.6 | 0.6 | 0.6 |

The reaction mixture was then poured into an open 27 cm×27 cm×27 cm metal box lined with paper. The foamed material produced in the process had the physical properties described hereinafter.

First a slice 5 cm in thickness was cut from the side of the foam obtained. Further, 1 cm of the bottom zone was removed. Thereafter, the remaining foam core was cut into a layer 12 cm high.

FTC and the number of cells per centimeter were quantified as above.

The results of these determinations are reported in Table 13.

TABLE 13

Results for physical properties

|  | Comp 6 | Inv 16 | Inv 17 |
|---|---|---|---|
| cells/cm | 10 | 9.5 | 8.5 |
| FTC1/N | 166 | 130 | 125 |
| FTC11/N | 129 | 106 | 105 |
| FTC 1-11/N | 37 | 24 | 20 |

As regards the number of cells, the inventive examples show that the use of mix 1 also leads to a coarsened cellular structure in this case. The force-to-crush values (FTC1) also reveal that Foams Inv 16 and Inv 17 have a higher open-cell content.

The invention claimed is:
1. A process for production of polyurethane foam, said process comprising:
reacting one or more polyol components with one or more isocyanate components in the presence of an additive, wherein the additive is a wax having a predominately microcrystalline structure and having a congealing point from 50° C. to 85° C., and wherein the wax is present in an amount from 0.0001 to 0.1 parts by weight per 100 parts by weight of polyol, and wherein the wax is in a dispersed form and is present in a dispersion medium, said dispersion medium comprising at least one organic solvent.

2. The process according to claim 1, wherein the congealing point of the wax is from 55° C. to 80° C.

3. The process according to claim 1, wherein the wax is selected from mineral waxes, synthetic waxes and mixtures thereof.

4. The process according to claim 1, wherein the wax has an entirely microcrystalline structure.

5. A polyurethane foam obtained by a process according to claim 1.

6. The polyurethane foam according to claim 5, wherein said polyurethane foam is a polyurethane flexible foam, a hot-cure flexible foam, a rigid foam, an ester foam, a viscoelastic flexible foam or a high-resilience foam (HR foam).

7. The process according to claim 1, wherein the congealing point of the wax is from 60° C. to 75° C.

8. The process according to claim 1, wherein the one or more isocyanate components comprise 2, 4-toylene diisocynate.

9. A polyurethane foam obtained by a process according to claim 2.

10. A polyurethane foam obtained by a process according to claim 3.

11. The process according to claim 1, wherein the organic solvent is an ester of a monohydric or polyhydric alcohol.

12. The process of claim 11, wherein the ester is selected from the group consisting of a glycerol ester and a sorbitol ester.

13. The process according to claim 1, wherein dispersed form of the wax comprises from 0.1 to less than 10 weight percent of the wax and at least 90 weight percent of the dispersing medium.

14. A process for production of polyurethane foam, said process comprising:
    reacting one or more polyol components with 2, 4-toylene diisocynate in the presence of an additive, wherein the additive is a wax having a predominately microcrystalline structure and having a congealing point from 50° C. to 85° C., and wherein the wax is present in an amount from 0.0001 to 1 parts by weight per 100 parts by weight of polyol, and wherein the wax is in a dispersed form and is present in a dispersion medium, said dispersion medium comprising a glycerol ester or a sorbital ester.

15. The process according to claim 14, wherein the congealing point of the wax is from 60° C. to 75° C.

16. The process according to claim 14, wherein the wax is selected from mineral waxes, synthetic waxes and mixtures thereof.

17. The process according to claim 14, wherein the wax has an entirely microcrystalline structure.

18. A polyurethane foam obtained by a process according to claim 14.

19. The polyurethane foam according to claim 18, wherein said polyurethane foam is a polyurethane flexible foam, a hot-cure flexible foam, a rigid foam, an ester foam, a viscoelastic flexible foam or a high-resilience foam (HR foam).

* * * * *